(12) United States Patent  (10) Patent No.: US 8,370,075 B2
Goldman et al.  (45) Date of Patent: Feb. 5, 2013

(54) PORTABLE PLANT HEIGHT AND EAR HEIGHT MEASURING DEVICE

(75) Inventors: Daniel M. Goldman, Des Moines, IA (US); James L. Hunter, Littleton, CO (US); Timothy P. Meyer, Des Moines, IA (US)

(73) Assignee: Pioneer Hi Bred International Inc, Johnston, IA (US)

( * ) Notice: Subject to any disclaimer, the term of this patent is extended or adjusted under 35 U.S.C. 154(b) by 336 days.

(21) Appl. No.: 12/649,977

(22) Filed: Dec. 30, 2009

(65) Prior Publication Data

US 2010/0179767 A1  Jul. 15, 2010

Related U.S. Application Data

(60) Provisional application No. 61/143,885, filed on Jan. 12, 2009.

(51) Int. Cl.
*G01N 33/48* (2006.01)
(52) U.S. Cl. ........................................................ 702/19
(58) Field of Classification Search ............... 702/19
See application file for complete search history.

(56) References Cited

PUBLICATIONS

Chapter 8—Total Station Topographic Survey Procedures. Jan. 1, 2007.*
Loy, Jim, "How Tall is That Tree?" Copyright 2000.*
Maltamo, et al., Estimation of stem volume using laser scanning-based canopy height metrics, Forestry Oxford Journals, (2006), 79(2):217-229.
Weltz, et al., Comparison of laser and field measurements of vegetation height and canopy cover, Water Resources Research, (1994), 30(5): 1311-1319.
Harding, et al., Laser altimeter canopy height profiles: methods and validation for closed-canopy, broadleaf forests, Remote Sensing of Environment (2001), 76(3): 283-297.
Shrestha, et al., Corn Plant Height Estimation Using Two Sensing Systems, USDA Agricultural Research Service, ASAE Annual International Meeting, (2002).
Thomsen, et al., Mobile measurement of potato canopy structure and spectral reflectance, 5th European Conference on Precision Agriculture, Swedish Institute of Agricultural and Environmental Engineering (2005), p. 287-289.
Thomsen, et al., Mobile measurement of potato canopy structure and spectral reflectance, 5th European Conference on Precision Agriculture, Swedish Institute of Agricultural and Environmental Engineering (2005), (Poster only).

* cited by examiner

*Primary Examiner* — Sujoy Kundu

(57) ABSTRACT

A method and apparatus for dimensionally characterizing a target structure. In an example of the apparatus, the apparatus has a pole having a bottom end and a top end, an indicator system adapted to apprise an operator of the position of a dimension determination system relative to the target structure, and a measurement system adapted to apprise the operator of a dimension of one or more features of the target structure. In another example, the method includes taking a pole having a bottom and top end with a height determination system, a height indicator system and a height measurement system, orienting the pole relative to the plant structure, raising the height determination system to the height of the target plant structure, and determining the height of the target plant structure.

34 Claims, 5 Drawing Sheets

US 8,370,075 B2

PORTABLE PLANT HEIGHT AND EAR HEIGHT MEASURING DEVICE

RELATED APPLICATIONS

This application claims priority under 35 U.S.C. §119 to U.S. Provisional Patent Application No. 61/143,885 filed Jan. 12, 2009, which application is hereby incorporated by reference in its entirety.

FIELD OF THE INVENTION

The present invention relates generally to a method and apparatus for dimensionally characterizing a target structure, and more particularly to a method and apparatus for characterizing the height/length, such as ear or tassel height/length of a plant structure from ground level or some reference point using a portable plant height and ear height measuring device.

BACKGROUND OF THE INVENTION

Assessing growth kinetics using the present apparatuses and methods available for can be a labor intensive process requiring an undue amount of resources and time. For example, one apparatus and method for assessing the height of a plant required at least two people. The first person would hold a measuring tool upright relative to the plant and raise or extend the tool until the top of the tool approached the top of the plant, at least from the first person's perspective. The second would stand far enough back of the first person to confirm that the top of the tool was indeed at the top of the plant. The first person alone could not accurately position the tool's top at the height of the plant due to parallax error, ergo the second person's perspective is needed to confirm when the tool and plant are level with each other. Continuing with this same scenario and as with other examples of tools used to assess plant growth kinetics, the process of identifying plants, recording growth data specific to the plants and storing the growth data can be cumbersome, time consuming and ultimately result in an undue allocation of business resources, human or otherwise.

A need has therefore been identified in the art for a more efficient way of monitoring growth kinetics for a target plant structure, and more specifically characterizing the height and/or ear height of a target plant structure from ground level, as well as identifying, recording and storing growth data using a portable plant height and ear height measuring device.

BRIEF SUMMARY

One aspect of the present invention is to provide a method and apparatus for characterizing the height for one or more target plant structures from ground level or some other reference point.

In one general example of the apparatus, the apparatus includes a pole having a bottom end and a top end, an indicator system adapted to apprise an operator of the position of a dimension determination system relative to the target structure, and a measurement system adapted to apprise the operator of a dimension of one or more features of the target structure.

In one general example of the method, the method includes taking a pole having a bottom and opposite top end with a height determination system, a height indicator system and a height measurement system, wherein the height determination system is positioned at or near the top end, orienting the pole relative to the target plant structure, raising the height determination system to the height of the target plant structure, and determining the height of the target plant structure with the height measurement system.

DETAILED DESCRIPTION

Overview

Figure 1:
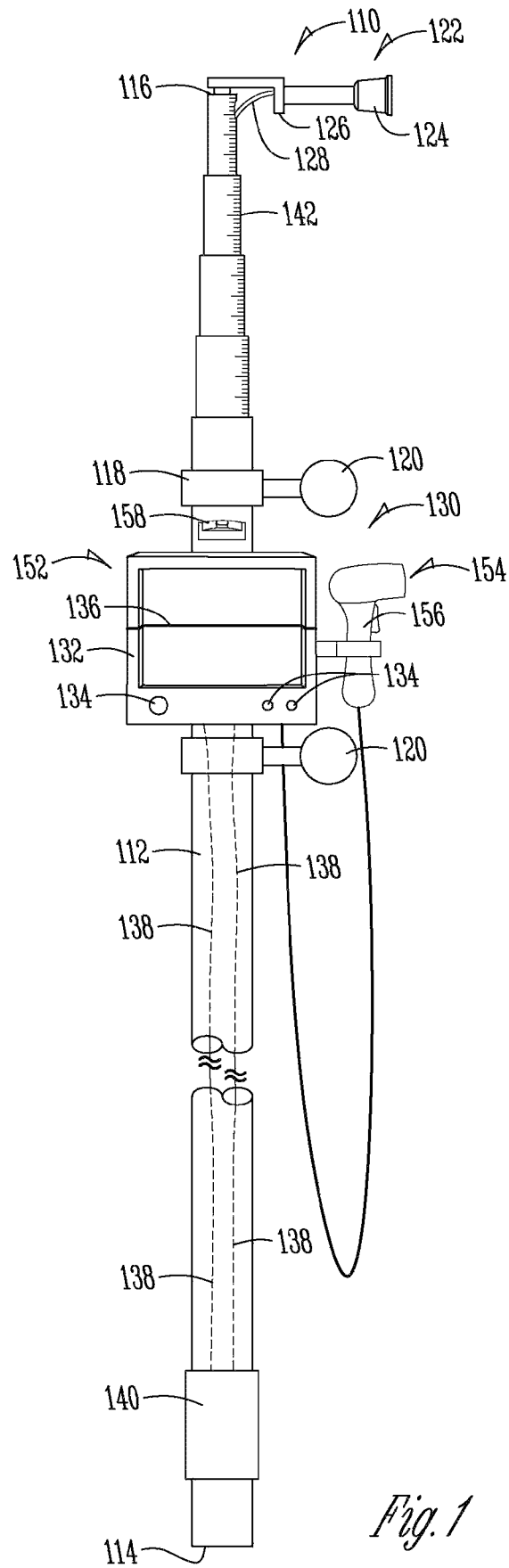
FIG. 1 is a side elevation view of one exemplary embodiment of the present invention.

For a better understanding of the invention, several exemplary embodiments will now be described in detail. Reference will be taken from time-to-time to the appended drawings. Reference numerals will be used to indicate certain parts or locations in the drawings. The same reference numerals will indicate the same parts or locations throughout the drawings unless otherwise indicated.

Apparatus

FIGS. 1-5 disclose several aspects of the apparatus of the present invention. One aspect of the present invention is fulfilled by the apparatus 110 shown in FIG. 1. The apparatus 110 of the present invention allows for dimensionally characterizing a target structure, whether of living or non-living materials. For example, apparatus 110 facilitates characterizing a height for one or more target plant structures 148 and 150 of target plant 146 (shown in FIG. 2) taken from ground level. Characterizing the height of one or more target plant structures, including other portions of the plant structure, can also be accomplished by other aspects of the present invention disclosed by apparatus 210, 310 in FIGS. 3-5.

The plant height characterizing apparatuses shown in FIGS. 1-5 are only for the purpose of showing the several various aspects of the present invention and should not be deemed limiting as the present invention may take on various shapes, forms, functions, and operations as is deemed necessary and pertinent to the task of characterizing plant height and/or some other portion thereof as will be described in the proceeding description.

Shown in FIG. 1, apparatus 110 has a pole 112 as its central support member. The pole 112 has a bottom end 114 and an opposite top end 116. The pole 112 may take on several different embodiments. In one aspect, the pole 112 may be adapted to be telescopically extensible whereby the top end 116 is extendable away from the bottom end 114 and/or ground level. Those skilled in the art can appreciate that pole 112 may extended or erected by folding one or more parallel sections, connected together by hinges or another connection, into a vertical member. The extension of the pole 112 could be performed both manually and automatically. The extension of the pole 112 could be mechanized. In another aspect, the pole 112 may be formed from a fixed length member, such as the pole 212 of apparatus 210 shown in FIGS. 3 and 4, wherein the bottom end 214 and opposite top end 216 are separated by a fixed distance along the length of the pole 212. The pole 212 may be extended vertically by increasing the distance of the bottom end 214 from ground level or some other reference point. In yet another aspect of the present invention, apparatus 310 may have a pole 312 having separate sections or portions spaced apart between the bottom end 314 and opposite top end 316, wherein a top portion of the pole 312 is received within or alongside the bottom portion of the pole 213 so that the top portion may extend vertically upward to move the top end 316 away from the bottom end 314. In any aspect of the present invention where the pole 112, 212, and 312 is manually extensible, clamping collars could be positioned along extensible portions thereof to ensure that pole 112, 212, and 312 remains in the vertically extended position. The present invention contemplates that pole 112, 212, and 312 could be fixed in length. For example, pole 112, 212, and 312 could be of a sufficient length such that no adjustment of pole 112, 212, and 312 is needed to position height determination system 122, 222, and 322 level with target plant structure 148 and 150 of interest. In this embodiment, sensors positioned along pole 112, 212, and 312 could be spaced sufficiently close to each other so that the target plant structure 148 and 150 of interest can be measured without manipulation of the length or height of pole 112, 212, and 312. Not having to adjust the height or length of pole 112, 212, and 312 would allow for higher throughput efficiencies and prevent possible measurement errors resulting from misalignment of pole 112, 212, and 312 and/or transcription errors.

Pole 112, 212, and 312 could be constructed of a lightweight material offering sufficient rigidity to resist such things as wind and motion, and having material characteristics capable of resisting corrosive and degradation effects of moisture, dust, sunlight or other effects resulting from the work environment. It should also be appreciated that the bottom end 114, 214, and 314 is constructed having sufficient strength and an adequate foot print so as to support vertical placement of the pole on the ground. For example, a spreader foot could be included on the bottom end 114, 214, and 314 to support vertical placement of pole 112, 212, and 312 on the ground. In still another aspect of the present invention, the pole 112, 212, and 312 may include a sighting bubble 158 adapted to apprise the operator 144 when the pole is plumb or vertically aligned relative to the target plant structure 148 and 150 of target plant 146. The pole may further include an electrical-mechanical device adapted to apprise the operator 144 when the pole is plumb. The pole 112, 212, and 312 may include one or more brackets 118, 218, and 318 having handles 120, 220, and 320, wherein the brackets are adjustable along the length of the pole. The brackets 118, 218, and 318 may be used for handling the pole, and/or attaching or adjusting the position of various components, wires or the like to or along the length of the pole. Brackets 118, 218, and 318 also may facilitate retention of the pole within a vertically extended position relative to the plant structure.

Figure 2:
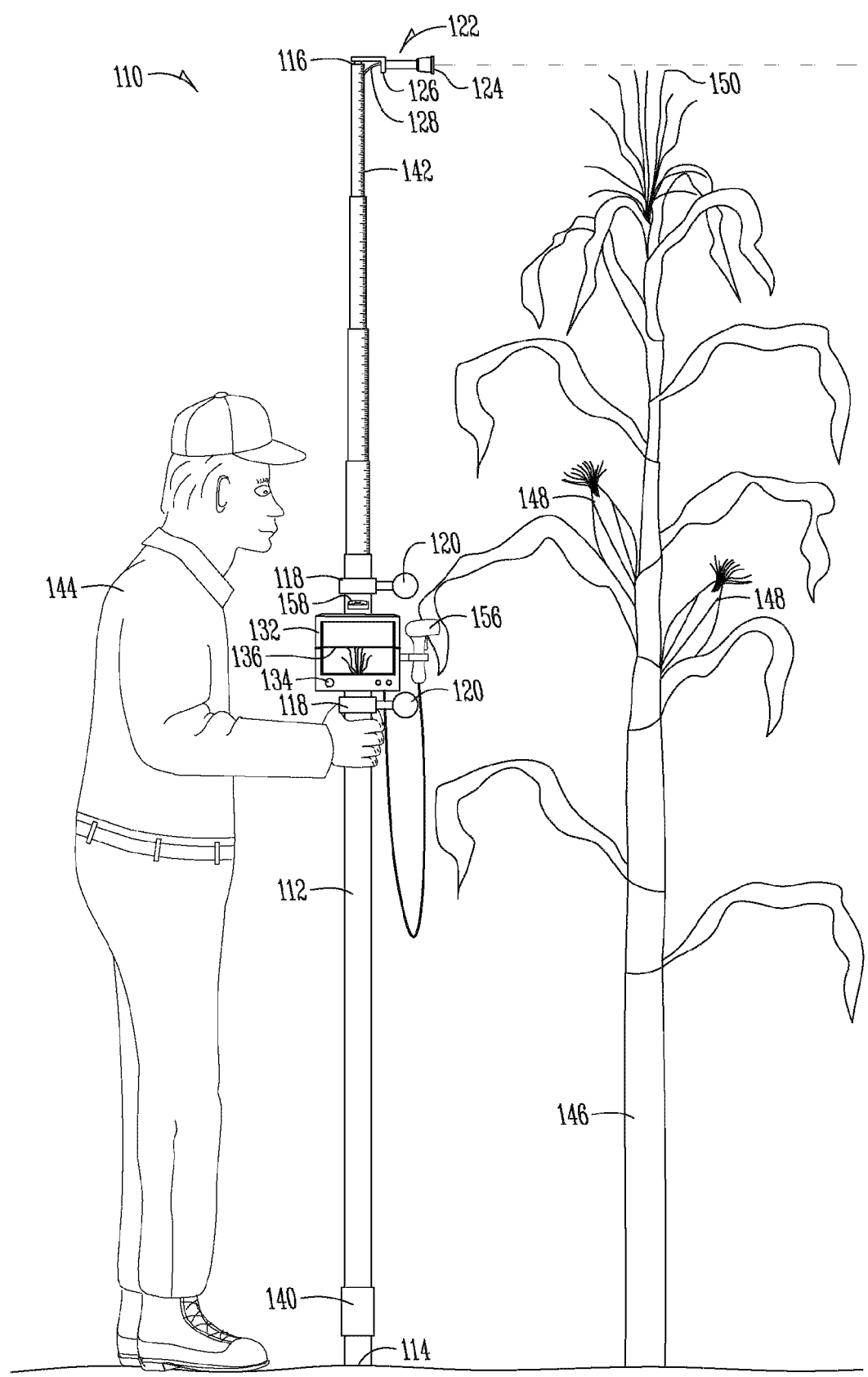
FIG. 2 is an operational side elevation view of the apparatus shown in FIG. 1.
Figure 4:
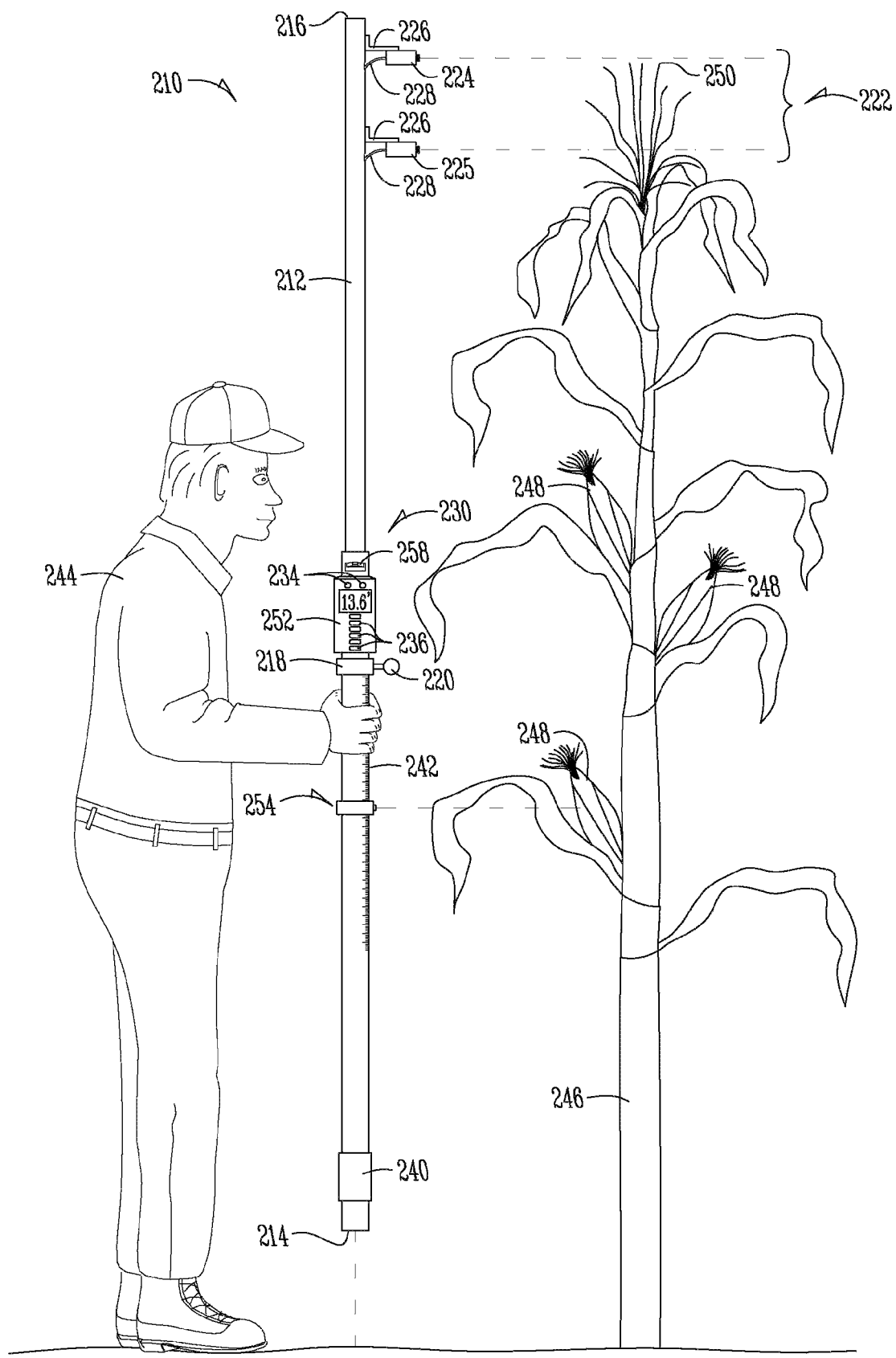
FIG. 4 is an operational side elevation view of the apparatus shown in FIG. 3.
Figure 5:
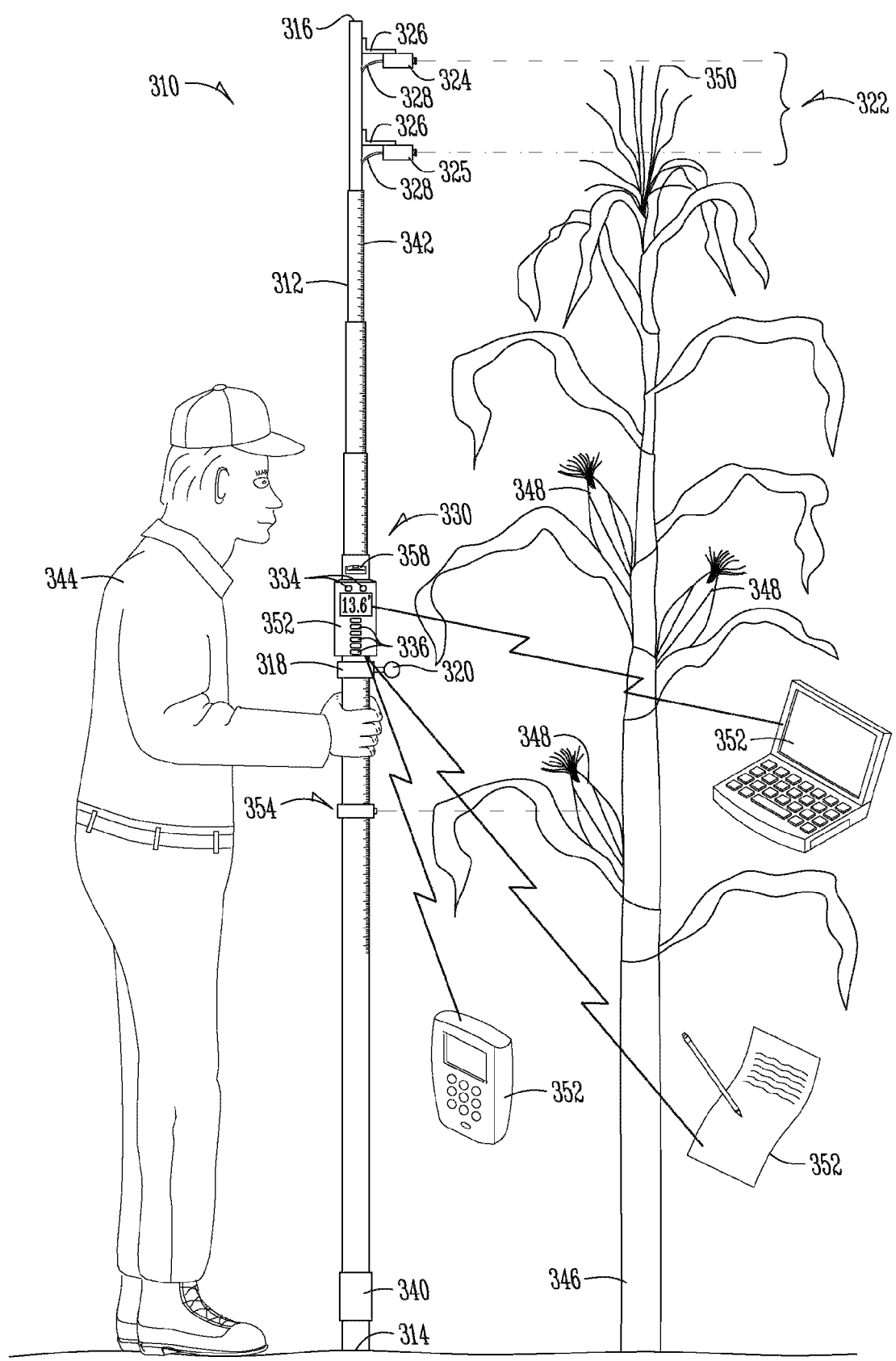
FIG. 5 is a side elevation view of an alternative embodiment of the apparatus shown in FIG. 3.

FIGS. 2, 4 and 5 disclose the plant structure 146, 246, and 346 as being a corn plant for the purposes of example only. The embodiments of the invention are not limited to measuring corn plants and their associated structures, but rather the embodiments may be used to measure a wide variety of different plants and plant structures. The present invention is not limited to characterizing height and length data for living materials only. The present invention also contemplates use in characterizing height and length data for non-living materials. It should be appreciated that present invention is well suited for characterizing plant heights of all types of target plants or plant structures where growth kinetics data may be desired or needed.

Situated at or near the top end of each pole of the present invention is a height determination system 122, 222, and 322. The overall purpose of the height determination system is to facilitate single operator use of the apparatus by apprising the operator of the position of the height determination system relative to the target plant structure. In this manner, the present invention does away with the need for multiple operators, one for holding the apparatus and another for accurately assessing whether the top end or some other measuring point is level with the height of a portion of the target plant structure which the operator desires to measure.

FIG. 1 shows one aspect of the present invention wherein the height determination system 122 has a camera 124 supported by a bracket 126 at or near the top end 116 of the pole 112. The camera 124 may be used to apprise the operator 124 of the position of the top end 116 of the pole 112 relative to the target plant structure 148 and 150 of target plant 146, as best illustrated in FIG. 2. The camera 124 may convey images by wire 128 connection to a height indicator system 130 connected to the pole 112. It should be appreciated that, although camera 124 is shown connected to the height indicator system 130 by wire 128, a wireless connection may also be a feasible alternative for communicating images from the camera 124 to the height indicator system 130. The height indicator system 130 includes a display 132 having controls 134 and a target line 136. Real time imagery from camera 124 could be shown on display 132, as illustrated in FIG. 2. A target line 136, whether as part of the display 132 or electronically generated, may be used to apprise the operator 144 of the height of the camera 124 and/or the top end 116 of the pole 112 relative to the target plant structure 148 and 150 of target plant 146, as best illustrated in FIG. 2. Using the target line 136 on the display 132, the operator 144 can continually monitor the height of the camera 124 relative to the target plant structure 146 by simply viewing the display 132. Thus, in one aspect of the present invention, the operator 144 may telescopically extend the top end 116 of the pole 112 vertically upward to the height of the target plant structure 148 and 150 of target plant 146 and be apprised by viewing the display 132 when the camera 124 is level with the height of the target plant structure 148 and 150 of target plant 146. Display 132 is further connected by one or more wires 138 to power source 140. It should be appreciated that display 132, camera 124, and other electrically operated components of the apparatus 110 would preferably have minimal voltage requirements for operation to thereby preserve power source 140 and thereby extending the operational time of the apparatus 110. Power source 140 may be positioned at or near the bottom end 114 of the pole 112 to aid in adding balance to the pole 112 and facilitating keeping the pole 112 in the vertically upright and/or plumb positions. Power source 140 may be a depletable power source, rechargeable or the like adapted to operate one or more components of the apparatus 110. For example, the power source 140 may include a solar array adapted to power or recharge electronics or power mechanics associated with the apparatus 110. Although the apparatus 110 shown in FIGS. 1 and 2 uses a display 132 attached to the pole 112, it should be appreciated by those skilled in the art that images from camera 124 could be communicated to a portable computing device, such as a PDA or other handheld computing device. Although FIG. 1 shows a camera 124 used to communicate images to display 132, it should be appreciated that other arrangements may be used to communicate images from a perspective taken at or near the top end 116 of the pole 112 relative to target plant structure 148 and 150 of target plant 146 and made viewable to the operator 144. For example, apparatus 110 could also be equipped with a periscope-like array of mirrors adapted to convey images from a perspective at or near the top end 116 of the pole 112 relative to the target plant structure 148 and 150 of target plant 146 which are ultimately conveyed and made viewable to the operator 144.

Figure 3:
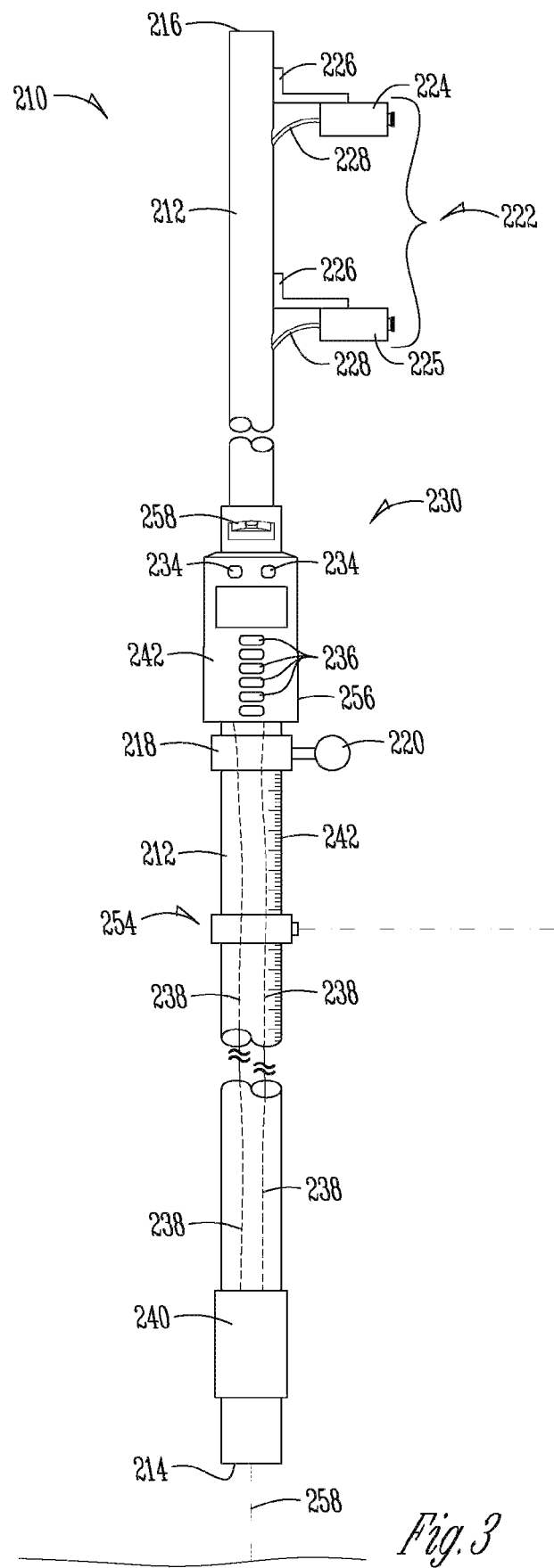
FIG. 3 is a side elevation view of another exemplary embodiment of the present invention.

The apparatus 110 may also include a height measurement system 142. The height measurement system 142 is adapted to apprise the operator 144 of the height of the height determination system 122 relative to the height of the target plant structure 148 and 150 of target plant 146. For example, the height measurement system 142 may be used to measure tassel height 150 or ear height 148. In one aspect of the present invention, as shown in FIG. 1, the height measurement system 142 may be made up of measurement markings or indicia along the length of the pole 112 to indicate to the operator 144 the height of the camera 124. The operator 144 may determine the height of the camera 124 based on the measurement markings or indicia along the length of the pole 112 to determine the height of the target plant structure 148 and 150 of target plant 146 as best illustrated in FIG. 2. In another aspect of the present invention, the height measurement system 142 may be a laser-based length assessment device 256 adapted to apprise the operator 144 of the height of the height determination system 122 relative to the height of the target plant structure 148 and 150 of target plant 146. For example, the laser-based length assessment device 256 may be a laser distance measurer 256 using a laser beam 258 to acquire height, as shown in FIG. 3. In another aspect of the present invention, the height measurement system 142 may be a vision-based length assessment device, an ultrasonic sensor-based length assessment device, photoelectric sensor-based length assessment device, a sonar-based length assessment device, a potentiometer-based length assessment device, a tape-based length assessment device, such as a commercially available tape measure, or an encoder-based length assessment device, such as a magnetic tape-based system commercially available as a magnetic linear/rotary encoder system from Balluff Inc., 8125 Holton Drive, Florence, Ky. 41042. The present invention is not limited to the aforementioned height measurement systems 142, but includes other height measurement systems, such as a tooth, hole, magnet or pulse counter, a string pot, a linear encoder, a voltage divider, electronic length/distance sensor or a rotary to linear device. Apparatus 110, including height measurement system 142, may include a constant force or other spring mechanism to facilitate lifting and reduce operator fatigue, as well as increase speed-of-use of apparatus 110. The present invention contemplates other height measurement systems 142; for example, the height measurement system 142 could include a system where the lower portion of a measurement system 142 could include an ultrasonic emitter and a receiver to get the distance from one point to another, i.e. from the emitter at a fixed height to the top of the pole 112 to know how high the top of the apparatus 110 is. This could also be accomplished using a laser system. Alternatively, optical encoders, magnetic position sensors, cable extension transducers, and string type potentiometers can give distances between two points automatically.

In another aspect of the present invention, the apparatus 110 may further include a data acquisition system 152. The data acquisition system 152 may be a sub component of the height indicator system 130 or as a separate component thereto. The purpose of the data acquisition system 152 is to collect or acquire data from the height indicator system 130 and/or other data identifying, storing, recording devices. The data acquisition system 152 may be adapted to receive, share and process data, such as apply time stamps to height data so that growth kinetics data can be calculated and displayed for the target plant structure 148 and 150 of target plant 146. The data acquisition system 152 and/or height indicator system 130 may further include an identification system 154, which may be adapted to identify, in one aspect of the present invention, each plant structure 146 by a range/row identification method. For example, apparatus 110 may include a mobile computing device adapted to store data from the data acquisition system 152, calculate growth kinetics data, and provide access to the resultant data through a display 132 or other like output medium. In another aspect of this invention, the apparatus 110 may include a programmable logic controller (PLC) with a data store to store data from the data acquisition system 152. The PLC may be configured to time and date stamp the data to develop and calculate growth kinetics data as described in greater detail below. The present invention contemplates time and date stamping the height data for use in calculating the growth kinetics data. For example, plant height grew at a rate of 1"/day from June 15th to July 1st. This calculation is dependent at least upon having height measurements on June 15th and July 1st. Using data from intermediate dates, the operator can then characterize whether or not this growth rate is in fact linear for this time period of follows some other function. In another aspect of the present invention, the identification system 154 may include a scanner 156 adapted to scan a barcode associated with each plant structure 146. Another aspect of the present invention includes using the identification system 154 to remotely retrieve data from a radio frequency identification (RFID) tag associated with the plant structure 146. In yet another aspect of the present invention, the identification system 154 could be adapted to operate using an ultrasonic identification system for identifying the plant structure 146. It should be appreciated that other identification systems may be used to specifically identify one or more target plant structures and for associating growth kinetics data which is collected and recorded for each specific target plant structure associated with the target plant. For instance, the present invention further contemplates the identification system 154 having an optical character recognition (OCR) system adapted to read a tag associated with each plant structure for identifying and associating data with the specific plant structure. In another aspect, the identification system 154 includes the operator 144 manually recording and entering identifying information associated with each plant structure 146 into a log book or the like to identify the plant structure 146 and associate the measured data with the specific plant structure 146. FIG. 1 shows a scanner 156 associated with the identification system 154. The present invention contemplates that the identification system 154 may also include a mobile computing device adapted to identify each plant structure 146 by scanning an RFID tag, a barcode, a plant identification number, or plot identification number associated with one or more of the target plant structures.

FIG. 2 best illustrates a method for using the apparatus 110. In one aspect of use for the apparatus 110, operator 144 positions the pole 112 relative to the plant structure 146. The operator 144 may use the sighting bubble 158 shown in FIG. 1 to ensure that the pole 112 is vertically aligned or plumb. To ascertain the height of the target plant structure 148 and 150 of target plant 146, the operator 144 extends the camera 124 of the height determination system 122 vertically upward. The operator 144 is made aware of the position of the camera 124 relative to the height of the target plant structure 148 and 150 of target plant 146 by viewing the display 132 of the height indicator system 130. The display 132 may be positioned eyelevel with operator 144 to better suit the varying heights of each operator 144 and provide a better view of display 132. The operator 144 reads the measurement markings or indicia along the length of the pole 112 to ascertain the height of the target plant structure 148 and 150 of target plant 146 when the camera 124 is level with the height of the target plant structure 148 and 150 of target plant 146 as indcted by the target line 136 on display 132 being level with the height of the target plant structure 148 and 150 of target plant 146, which is viewable by the operator 144. The measurement data may be acquired using the data acquisition system 152 and the identification system 154 as previously described.

FIGS. 3-5 disclose still another aspect of the present invention. The apparatus 210 shown in FIGS. 3 and 4 has a height determination system 222, which like height acquisition 122, is adapted to apprise the operator 244 of the height of the height determination system 222 relative to the tassel height 250 or ear height 248 of the plant structure 246. In one aspect, the height determination system 222 may include one or more sensors forming a sensor array adapted to apprise the operator 244 of the height of the height determination system 222 with respect to the tassel height 250 or ear height 248 of the plant structure 246. As best illustrated in FIG. 3, the height determination system 222 has a pair of sensors 224, 225. It should be appreciated that, although FIG. 3 shows a pair of sensors, multiple sensors could make up the array of sensors used in the height determination system 222. Sensor 224, 225 may be mounted to pole 212 using bracket 226. Sensor 224, 225 may be spaced apart from one another at or near the top end 216 of the pole 212. In the preferred form, sensor 224, 225 project visible light away from the pole 212 in a plane perpendicular to the same plane as pole 212. Both sensor 224, 225 are connected to height indicator system 230 by wire 228. The height indicator system 230 has a display 232 and controls 234 for operating the height indicator system 230. Shown on the display 232 or as part of the height indicator system 230 are height indicators 236. The height indicator system 230 may also include a height measurement system 242. Alternatively, the height measurement system 242 may be a separate component from the height indicator system 230. A power source 240 is provided and connected to the height indicator system 230 and/or height measurement system 242 by wires 248. The power source 240 is further adapted to power sensor 224, 225 of the height determination system 222. Sensor 224, 225 may be wired to height indicator system 230 and/or height measurement system 242. Either or both height measurement system 242 and height indicator system 230 may be adapted to receive signals from sensor 224, 225. The height indicator system 230 may be configured so that the operator 244 is notified when light emitting from the highest or vertical most sensor 224 is unobstructed. The operator may be notified using the height indicator system 230. In one aspect, the height indicators 236 on the display 232 may be lights, such as LEDs, that remain lit or turn off when light emitting from sensor 224, 225 is unobstructed. Thus, as the sensor array, including sensor 224, 225 is raised to the tassel height 250 or ear height 248 of the plant structure 246, both sensor 224, 225 remain obstructed by the target plant structure 250 or 248 until at which point the highest or vertical most sensor 224 extends beyond the height of the target plant structure 250 or 248 whereby the light emitting from sensor 224 is no longer obstructed by the target plant structure 250 or 248 (sensor 225 remains obstructed by the target plant structure 250 or 248). Height indicators 236 on display 232, as previously indicated, may be adapted to show whether light emitting from sensor 224, 225 is obstructed or unobstructed. In one aspect of the present invention, height indicators 236 remain lit while sensor 224, 225 is obstructed and turn off when as sensor 224, 225 become unobstructed; thus, indicating sensor 224 or 225 has cleared the height of the target plant structure 250 or 248. At this point, the operator 244 may engage or activate the height measurement system 242 to ascertain the height of the target plant structure 250 or 248. For example, the operator 244 may view a single light to indicate when the top and bottom sensor are both unobstructed. In one aspect of the apparatus 210, the height measurement system 242 may be a laser distance measurer. In another aspect, height measurement system 242 may be an electronic or mechanical type sensor, similar in operation to a dipstick, thereby providing a height measuring system 242. The laser distance measurer may be adapted to measure the distance to ground level from the position where the laser distance measurer is mounted on the pole 212. The fixed distance between the laser distance measurer and the sensor array of sensor 224, 225 may be added into the distance from the laser measurer. Length indicator system 230 and/or height measurement system 242 may be similarly equipped as apparatus 110 having a data acquisition system and identification system.

In other aspect of the apparatus 210, a secondary measurement device 254 is included. The secondary measurement device 254 may be used to measure the ear height 248 or tassel height 250 associated with the plant structure 246 as best illustrated in FIG. 4. The secondary measurement device 254 may be a fan laser or similar device adapted to measure the height of at least one of the target plant structures 250 or 248. Measurement marks or indicia may be positioned along the length of the pole 212 to indicate to the operator 244 the height of the secondary measurement device 254 relative to the ear height 248 of the plant structure 246. Secondary measurement device 254 may also include a fan laser for measuring ear height or turned the other way as a pointer.

FIG. 4 best illustrates one method for operating the apparatus 210. Similar to operating apparatus 110, the operator 244 positions apparatus 210 in a vertical position relative to the plant structure 246. The operator may use a sighting bubble or an electrical-mechanical device to confirm that the pole 212 is plumb. The operator 244 raises the pole 212 in a vertical direction along the height of the plant structure 246. Light emitting from sensor 224, 225 is obstructed by the plant structure 246 as the pole 212 is raised in a vertical direction along the height of the target plant structure 250 or 248. When the vertical most sensor 224 extends beyond the height of the target plant structure 250 or 248, the light emitting from the vertical most sensor 224 is unobstructed, which is indicated to the operator 244 by the height indicators 236 on the display 232. The operator 244 engages the height measurement system 242 to determine the height of the target plant structure 250 or 248. The height measurement system 242 may be adapted to automatically adjust the height measurements to include the distance between the height measurement system 242 and the midpoint between sensors 224, 225. Similarly, the operator 244 may also adjust the height of the secondary measurement device 254 to the height of the target plant structure 250 or 248 to ascertain height measurements for one or more target plant structures associated with plant structure 246. Reading the measurement markings or indicia on the pole 212, the operator 244 can measure the ear height 250 or tassel height 250 of the plant structure 246. It should be appreciated that the secondary measurement device 254 may be used to measure any portion of the plant structure 246. FIG. 5 shows apparatus 310 which is similar to apparatus 210 shown in FIGS. 3 and 4. According to one aspect of the apparatus 310, the pole 312 is telescopically extensible, whereby the operator 344 raises the top end 316 of the pole 312 to the height of the target plant structure 348 or 350 by extending the pole. The apparatus 310 has a height determination system with sensors 324, 325 mounted to pole 312 using bracket 326. Wires 328 connect the height determination system 322 to the height indicator system 330. The height indicator system 330 has a display 332 with controls 334 and height indicators 336 may be normally lit or unlit when the sensors 324, 325 are obstructed or unobstructed by the target plant structure 348 or 350. The height indicator system 330 and height determination system 322 are powered by power source 340 and connected to power source 340 by wires 338. When the height indicator 336 indicates to the operator 334 that the highest or vertical most sensor 324 is no longer obstructed by the target plant structure 326, the operator 344 may read the height of the target plant structure 348 or 350 from the height measurement system 342. Similarly, the operator 334 could be apprised when sensors 324, 325 are in the correct position and by actuation of an accept button, automatically transfer the display value associated with the laser to a recording device. The height indicator system 342 includes measurement marks or indicia along the pole 312 that indicate to the user the height of the pole 312 relative to the target plant structure 348 or 350. The height measurement system 342 may also be configured to use a tape measure adapted and/or integrated into the pole 312 to indicate to the operator 344 the height of the height determination system 322 relative to the height of the target plant structure 348 or 350. Similar to the apparatus 210 shown in FIGS. 3 and 4, the apparatus 310 shown in FIG. 5 may include a secondary measurement device 354 adapted to measure the ear height 348 or tassel height 350 of the plant structure 346. Also, as previously discussed, the height indicator system may be adapted to communicate wirelessly or by wire to one or more mobile computing devices 352, such as a personal computing device, PDA, handheld device or the like. Additionally, a manual database 356 may be used to manually record height readings from the height measurement system 342.

The preferred embodiment of the present invention has been set forth in the drawings and specification and although specific terms are employed, these are used in the generically descriptive sense only and are not used for the purposes of limitation. Changes in the formed proportion of parts as well as in the substitution of equivalence are contemplated as circumstances may suggest or are rendered expedient without departing from the spirit and scope of the invention as further defined in the following claims.

What is claimed is:

1. An apparatus for acquiring dimensional characteristics of a target living plant, the apparatus comprising:
    a pole having a bottom end and a top end;
    an indicator system adapted to apprise an operator of the position of a dimension determination system relative to the target living plant; and
    a measurement system adapted to apprise the operator of a dimension of one or more features of the target living plant.

2. The apparatus of claim 1 wherein the dimension determination system is an image acquisition system adapted to apprise an operator of the position of the image acquisition system with respect to the target living plant.

3. The apparatus of claim 2 wherein the image acquisition system further comprises a camera adapted to communicate images to a display on the pole viewable by the operator.

4. The apparatus of claim 3 wherein the display has a target line adapted to apprise the operator when the camera is level with the target living plant.

5. The apparatus of claim 2 wherein the image acquisition system further comprises a periscope-like array of mirrors adapted to apprise the operator when the top of the pole is level with the target living plant.

6. The apparatus of claim 1 wherein the dimension determination system is a sensor system adapted to project light onto the target living plant to apprise an operator of the position of the sensor system relative to the target living plant.

7. The apparatus of claim 1 wherein the measurement system is adapted to apprise the operator of the position of the dimension determination system relative to the target living plant, the measurement system comprising at least one of:
    a. a laser-based dimensional assessment device;
    b. a sonar-based dimensional assessment device;
    c. a potentiometer-based dimensional assessment device;
    d. a tape-based dimensional assessment device;
    e. an ultrasonic sensor-based dimensional assessment device;
    f. a vision-based dimensional assessment device;
    g. a photoelectric sensor-based dimensional assessment device;
    h. an encoder-based dimensional assessment device.

8. The apparatus of claim 1 wherein the measurement system further comprises a data acquisition system adapted for collecting data from the indicator system.

9. The apparatus of claim 1 for acquiring height and/or length of one or more target living plants.

10. The apparatus of claim 9 further comprises a programmable logic controller with a data store to store data from a data acquisition system, the programmable logic controller adapted to time and date stamp the data to develop and calculate growth kinetics data.

11. The apparatus of claim 1 further comprising an identification system adapted to identify the living plant at least by:
    a. range/row identification;
    b. operation of a bar code scanner of the apparatus adapted to scan a bar code associated with the living plant;
    c. remotely retrieve data from an RFID tag associated with the living plant;
    d. acoustic or ultrasonic identification of the living plant;
    e. an OCR system of the apparatus adapted to read a tag associated with each living plant for identifying the living plant.

12. The apparatus of claim 11 wherein the identification system comprises a mobile computing device adapted to identify the living plant by scanning an RFID tag, a bar code, a plant identification number, or plot identification number associated with one or more of the living plants.

13. The apparatus of claim 11 wherein the identification system comprises a GPS-based system to identify the living plant.

14. The apparatus of claim 9 wherein the dimension determination system further comprises a sensor array adapted to apprise an operator of the position of the dimension determination system with respect to the target living plant and relative to ground level.

15. The apparatus of claim 1 wherein the living plant is a corn plant.

16. The apparatus of claim 15 further comprising a secondary measurement device adapted to measure the height of an ear of corn on at least one corn plant.

17. The apparatus of claim 16 wherein the secondary measurement device comprises at least one of:
    a. a fan laser;
    b. a chalk line laser.

18. The apparatus of claim 14 wherein adjacent sensors in the sensor array are spaced sufficiently close to each other and along a sufficient length of the pole to dimensionally characterize the height and/or length of the target living plant with limited or no adjustment of the height of the pole.

19. An apparatus for characterizing from ground level a height for one or more target living plants, the apparatus comprising:
a pole having a bottom end and an opposite top end;
one or more sensors positioned at or near the top of the pole adapted to apprise an operator when at least one of the sensors extends beyond the height of the target living plant;
a height indicator system adapted to apprise the operator of the height of the sensors relative to the height of the target living plant; and
a height measurement system adapted to apprise the operator of the height of the target living plant from ground level.

20. The apparatus of claim 19 wherein the sensors comprise a two-sensor laser array adapted to apprise the operator when a vertical most laser sensor in the array is unobstructed by the height of the target living plant.

21. The apparatus of claim 19 wherein the height measurement system further comprises at least one of:
a. a laser distance measurer adapted to apprise the operator of the height of the target living plant;
b. a photoelectric sensor adapted to apprise the operator of the height of the target living plant.

22. A method for characterizing from ground level a height for one or more target living plants, the method comprising:
taking a pole having a bottom and opposite top end with a height determination system,
a height indicator system and a height measurement system;
orienting the pole relative to the target living plant;
raising the height determination system to the height of the target living plant; and
determining the height of the target living plant with the height measurement system.

23. The method of claim 22 further comprising the step of transferring images from a camera of the height determination system to a monitor of the height indicator system to apprise the operator when the camera is level with the height of the target living plant.

24. The method of claim 22 further comprising the step of viewing the height of the target living plant with a periscope-like array of mirrors of the height determination system adapted to apprise the operator when a vertical most mirror is level with the height of the target living plant.

25. The method of claim 22 further comprising the step of projecting light using a laser sensor or photoelectric array of the height determination system onto the target living plant to apprise the operator when at least one of the sensors is level with the height of the target living plant.

26. The method of claim 22 further comprising the step of reading the height of the target living plant from at least one of:
a. a laser-based length assessment device;
b. a sonar-based length assessment device;
c. an acoustic-based length assessment device;
d. an ultrasonic-based length assessment device;
e. a potentiometer-based length assessment device;
f. a voltage divider-based length assessment device;
g. an electronic sensor-based length assessment.

27. The method of claim 22 further comprising the step of identifying the living plant by scanning an RFID tag, a bar code, a plant identification number, a GPS-based system or plot identification number associated with one or more of the living plants.

28. The method of claim 22 further comprising the step of adjusting the height of a secondary measurement device along the pole for measuring the height of one or more other features of the target living plant.

29. The method of claim 27 further comprising the step of measuring the height of an ear of corn on the living plant with a fan laser of the secondary measurement system.

30. A method for characterizing from ground level a height for one or more target living plants, the method comprising:
taking a pole having a bottom and opposite top end with one or more sensors positioned at or near the top end;
orienting the pole relative to the target living plant;
extending at least one of the sensors until the sensor is unobstructed by the target living plant;
apprising the operator when the sensor becomes unobstructed using a height indicator system; and
reading the height of the pole relative to the target living plant using a height measurement system.

31. The method of claim 30 further comprising the step of adjusting the height of a secondary measurement system along the pole to the height of one or more other portions of the target living plant.

32. The method of claim 31 further comprising the step of determining the height of the other features of the target living plant with the secondary measurement system.

33. The method of claim 30 further comprising the step of identifying the target living plant with a plant identification system associated with the apparatus.

34. The method of claim 30 further comprising the step of storing height data from a data acquisition system on a data store associated with a programmable logic controller, the programmable logic controller adapted to time and date stamp the height data to develop and calculate growth kinetics data.

* * * * *